J. LAMB.
GAGE FOR SHEARS.
No. 170,570. Patented Nov. 30, 1875.
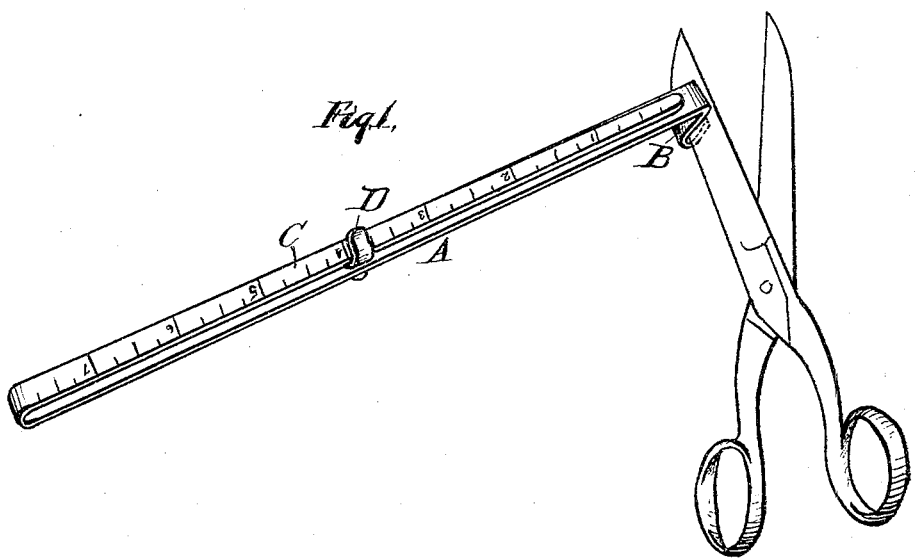
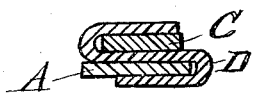

UNITED STATES PATENT OFFICE.

JOHN LAMB, OF JEFFERSONVILLE, NEW YORK.

IMPROVEMENT IN GAGES FOR SHEARS.

Specification forming part of Letters Patent No. 170,570, dated November 30, 1875; application filed January 18, 1875.

*To all whom it may concern:*

Be it known that I, JOHN LAMB, of Jeffersonville, county of Sullivan and State of New York, have invented certain new and useful Improvements in Gage for Shears, of which the following is a specification:

The nature of my invention consists in the construction and arrangement of a gage, to be attached to a pair of shears or scissors, to cut any width of goods desired, and is specially designed for cutting goods bias, as will be hereinafter more fully set forth.

In order to enable others skilled in the art to which my invention appertains to make and use the same, I will now proceed to describe its construction and operation, referring to the annexed drawing, which forms a part of this specification, in which—

Figure 1 is a perspective view of my gage attached to a pair of shears. Fig. 2 is a cross-section of the gage through the center of the slide.

A represents a tapering plate or strip of metal of suitable dimensions, one end of which is bent to form a groove, B, for the insertion of the lower point of the shears or scissors. This groove is so formed that the metal plate or strip will be held on the shears when thus inserted therein. The plate A is bent in the center double, the upper part being graduated on its upper surface and forming the gage-bar C. The graduations are made so as to commence at the end of the gage where the point of the shears is inserted. D represents a slide, made of a strip of metal placed between the bars A and C, one end being bent around the front edge and under the bar A, while the other end is bent around the rear edge and on top of the bar C. The gage thus constructed is taken in the left hand, with the graduated bar C up, and the lower point of the shears inserted in the groove B, after which the slide D is set for the width to be cut. The goods are then passed under the bar C, between it and the bar A, up against the gage D, when the goods may be cut the desired width.

This gage saves time, saves goods, and a true bias of any desired width may be cut with it. It may be attached to any shears or scissors.

Having thus fully described my invention, what I claim as new, and desire to secure by Letters Patent, is—

1. The within-described gage, consisting of the double bar A, having graduations on its upper surface, and a groove at one end, substantially as and for the purpose set forth.

2. The graduated double bar A, provided with the slide D and spring-jaw B, substantially as shown and described.

In testimony that I claim the foregoing as my invention I hereunto affix my signature this 12th day of January, 1875.

JOHN LAMB.

Witnesses:
JOHN C. MALL,
ENNICE COLE.